United States Patent
Baines

(10) Patent No.: US 10,738,761 B2
(45) Date of Patent: Aug. 11, 2020

(54) RAM AIR TURBINE GOVERNOR SPRING POSITIONING

(71) Applicant: Hamilton Sundstrand Corporation, Charlotte, NC (US)

(72) Inventor: Andrew N. Baines, Rockton, IL (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 280 days.

(21) Appl. No.: 15/627,744

(22) Filed: Jun. 20, 2017

(65) Prior Publication Data

US 2018/0363626 A1 Dec. 20, 2018

(51) Int. Cl.
| | |
|---|---|
| *B64D 41/00* | (2006.01) |
| *F03D 9/32* | (2016.01) |
| *F03D 7/02* | (2006.01) |
| *F02C 7/32* | (2006.01) |
| *F01D 7/02* | (2006.01) |
| *B64C 11/34* | (2006.01) |
| *F03D 7/04* | (2006.01) |

(52) U.S. Cl.
CPC ............ *F03D 7/0224* (2013.01); *B64C 11/34* (2013.01); *B64D 41/007* (2013.01); *F01D 7/02* (2013.01); *F02C 7/32* (2013.01); *F03D 7/041* (2013.01); *F05B 2220/10* (2013.01); *F05B 2220/31* (2013.01)

(58) Field of Classification Search
CPC ....... F03D 7/0224; F03D 7/041; B64C 11/34; F05B 2220/31
See application file for complete search history.

(56) References Cited

U.S. PATENT DOCUMENTS

| | | | | |
|---|---|---|---|---|
| 2,550,229 | A * | 4/1951 | Cotton ................... | B64D 27/04 244/3 |
| 2,815,188 | A * | 12/1957 | Nelson ..................... | F03D 7/02 415/148 |
| 2,988,327 | A * | 6/1961 | Nunn ........................ | F01D 9/04 415/156 |
| 3,339,639 | A * | 9/1967 | Elmes .................... | F03D 7/0224 415/4.1 |
| 3,635,583 | A | 1/1972 | Chilman et al. | |
| 4,411,596 | A * | 10/1983 | Chilman .............. | B64D 41/007 416/137 |
| 4,743,163 | A * | 5/1988 | Markunas ................. | F01D 7/02 416/137 |

(Continued)

OTHER PUBLICATIONS

European Search Report for EP Application No. 18178827.4 dated Oct. 17, 2018.

*Primary Examiner* — Eldon T Brockman
*Assistant Examiner* — Wesley Le Fisher
(74) *Attorney, Agent, or Firm* — Carlson, Gaskey & Olds, P.C.

(57) ABSTRACT

A ram air turbine has turbine blades connected to rotate a transmission shaft. The transmission shaft is connected to drive a first gear which is engaged to drive a second gear. The second gear is connected to rotate an output shaft extending through a strut away from the transmission shaft. A governor arrangement is configured to change a pitch angle of the blades in response to speed, and includes counterweights acting on a spring in the governor arrangement. The governor spring is positioned on an opposed side of the strut relative to the turbine.

18 Claims, 3 Drawing Sheets

(56) References Cited

U.S. PATENT DOCUMENTS

| | | | |
|---|---|---|---|
| 4,991,796 A * | 2/1991 | Peters | B64D 41/007 244/58 |
| 5,562,417 A | 10/1996 | Grimm et al. | |
| 7,296,970 B2 | 11/2007 | Bannon et al. | |
| 8,066,481 B2 | 11/2011 | Bannon | |
| 9,598,980 B2 | 3/2017 | Bannon et al. | |
| 2012/0093653 A1 | 4/2012 | Russ | |
| 2012/0114485 A1 | 5/2012 | Russ | |
| 2013/0287569 A1 | 10/2013 | Bannon et al. | |

* cited by examiner

US 10,738,761 B2

RAM AIR TURBINE GOVERNOR SPRING POSITIONING

BACKGROUND OF THE INVENTION

This application relates to a ram air turbine wherein the governor springs are positioned in a unique location.

Ram air turbines are known and typically include a turbine and blade set that is moved outwardly into an airflow path associated with an aircraft. The turbine is driven to rotate and an output shaft is driven by this rotation and utilized to generate electricity or other power.

In one example, a ram air turbine may be selectively deployed or stowed. In such an application, the ram air turbine may be moved to the deployed position in the event of a power failure for other sources of power associated with an aircraft.

In another application, the ram air turbine may be utilized to generate accessory electrical power. As one example, it may be utilized to provide power for a midair refueling operation.

A ram air turbine has a governor that controls the speed with which the components are driven to rotate. Typically, counterweights and governor springs interact to provide the desired speed.

To date, the governor springs have been co-located with the turbine positioned on a (forward) side of a strut through which the output shaft extends.

SUMMARY OF THE INVENTION

A ram air turbine has turbine blades connected to rotate a transmission shaft. The transmission shaft is connected to drive a first gear which is engaged to drive a second gear. The second gear is connected to rotate an output shaft extending through a strut away from the transmission shaft. A governor arrangement is configured to change a pitch angle of the blades in response to speed, and includes counterweights acting on a spring in the governor arrangement. The governor spring is positioned on an opposed side of the strut relative to the turbine.

These and other features may be best understood from the following drawings and specification.

DETAILED DESCRIPTION

Figure 1:
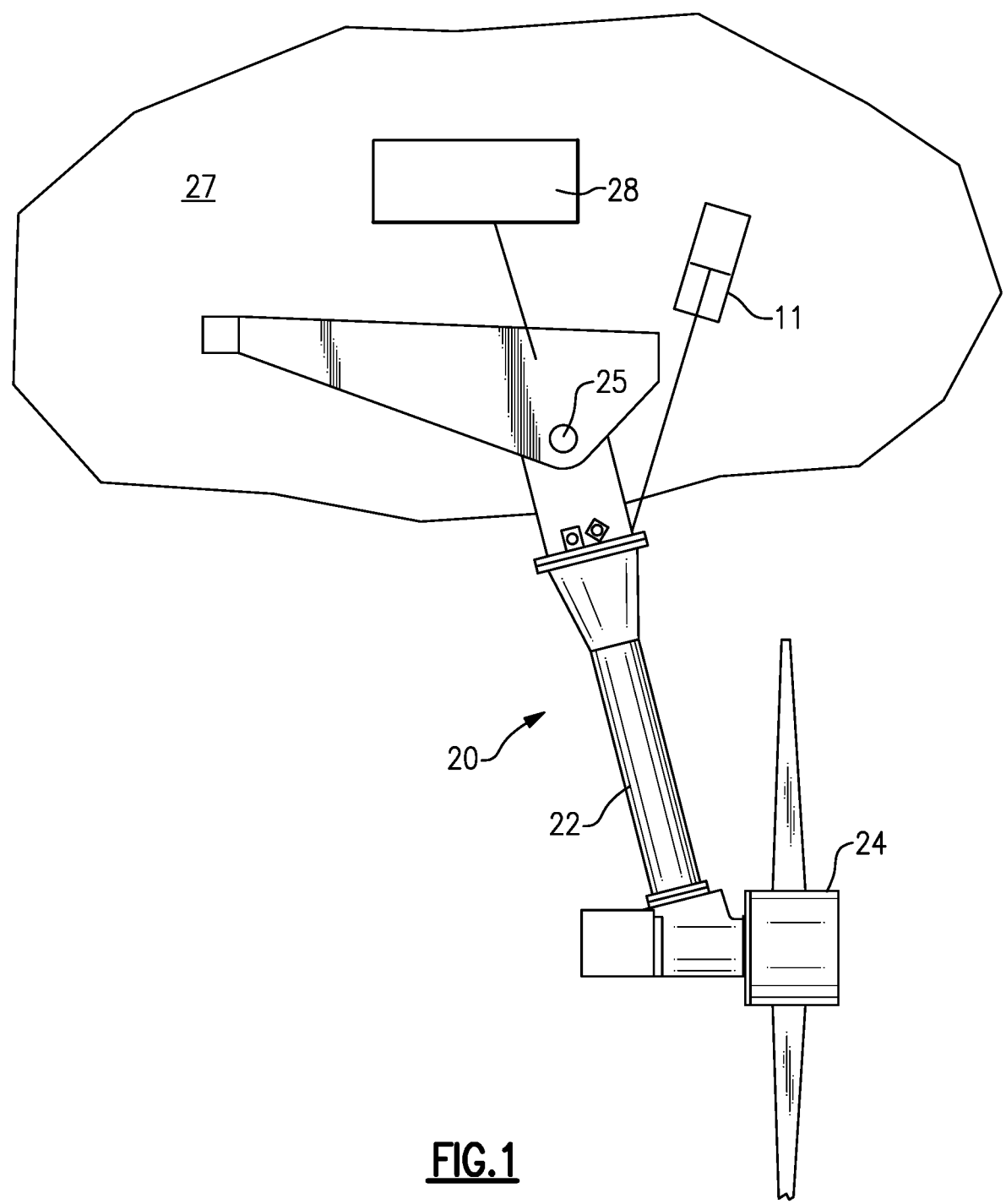
FIG. 1 schematically shows a ram air turbine.

A ram air turbine 20 is illustrated in FIG. 1. As known, a strut 22 is associated with a turbine 24 and a transmission housing 26. Turbine 24 includes blades 18. The ram air turbine may be mounted to the frame of an aircraft 23, shown schematically. As known, rotation of the turbine 24 generates electricity at a generator 28 in a known manner. This electricity may be used for any number of uses associated with the aircraft 27.

The ram air turbine 20 may pivot at point 25 between a stowed position and a deployed position and driven by an actuator 11. As mentioned above, the ram air turbine may be moved to the deployed position from the stowed position when its use is desired.

Figure 2A:
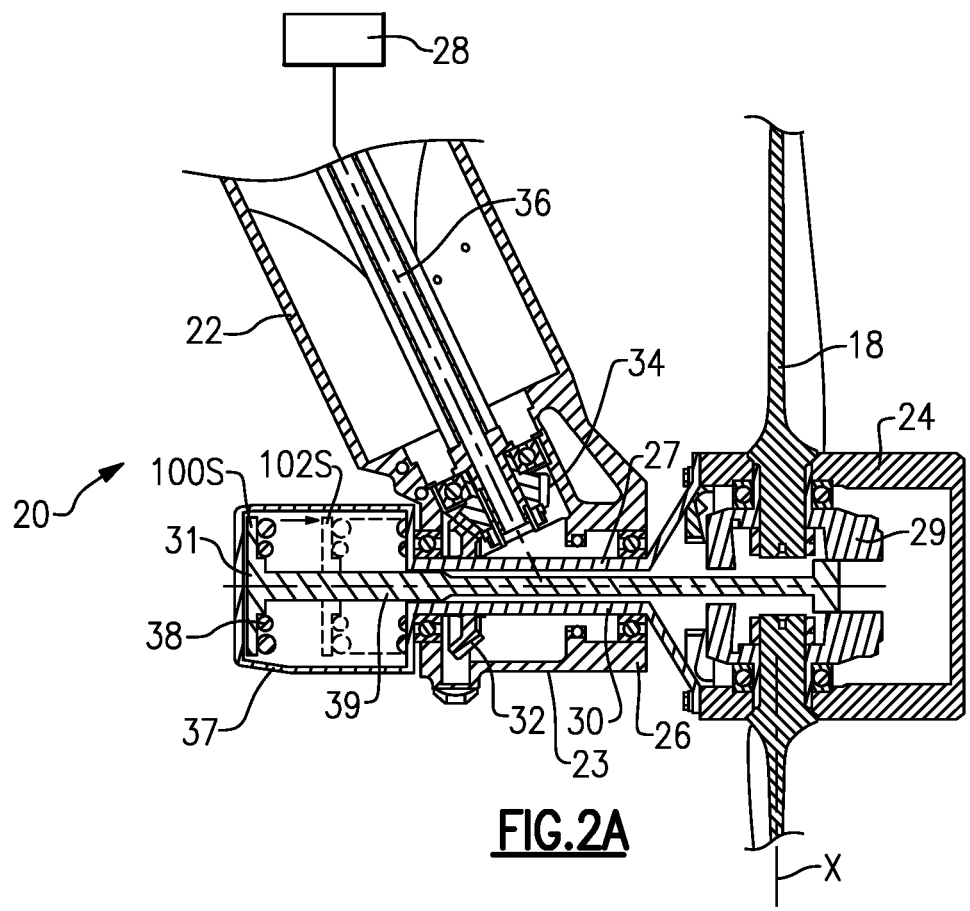
FIG. 2A shows a detail of a ram air turbine.

FIG. 2A shows a detail of the ram air turbine 20. As shown, counterweights 29 are associated with the turbine 24. The counterweights control the pitch of blades 18 on the turbine 24 in response to speed. A transmission shaft 26 rotates with turbine 24. A bevel gear 32 is driven by the shaft 26 and drives an associated bevel gear 34 on an output shaft 36 in the strut 22. The output shaft 36 extends to the generator 28 (or other power sources, such as a pump), as known.

Governor springs 38 operate against the plate 31 and hold a governor rod 39 to the left in this figure. The counterweights 29 also act on the endplate 31 and against the force of the spring 38. A housing 37 surrounds the springs 38 and also rotates.

Collectively, the springs 38 and counterweights 29 could be called a governor arrangement.

The governor rod 39 is caused to move axially against the force of the governor spring 38 when the counterweights move in a direction to change the pitch angle from fine pitch to coarse pitch.

Figure 2B:
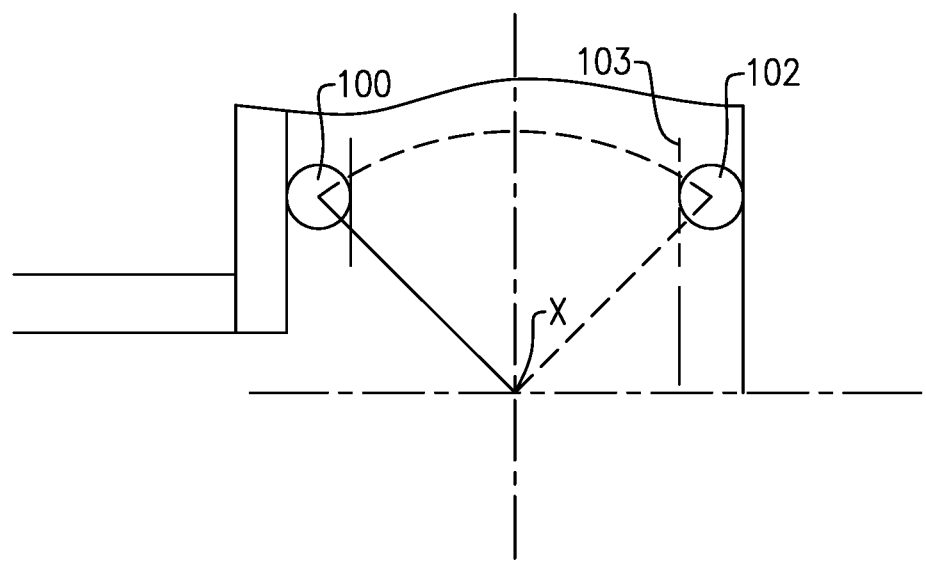
FIG. 2B shows a detail schematically.

FIG. 2B schematically shows the interaction between the governor weights 29 and the governor rod 39. As can be appreciated, when the speed of the turbine 24 is low, the blades 18 are held at a more open position. As the speed increases, the counterweights rotate, and in turn drives the blades 18 to a more coarse position. FIG. 2B shows this interaction, with a cam plate 103 which moves with the governor rod 39, and offset cam followers 102 which are a part of the counterweight 29 and the blades.

As also shown in FIG. 2B, a pivot axis X of the blades 108 is shown. Again, the groove and cam plate 103 is part of the governor rod 39. The pins, which are illustrated at 100 and 102, move as the governor weights pivot. As known, the governor weights 29 and blades 18 move as one such that as the pins move from the position 100 to the position 102, the angle of the blades 18 changes about the axis X. The associated spring positions 100S and 102S are also shown.

In FIG. 2B, the pins move from the position 100, which achieves a relatively open position of the blades 18, and as speed increases, they are moved to position 102, to pivot the blades 18 to a more closed position.

At any rate, the basic movement of the governor weights 29, blades 18, and governor rods 39 is generally as known, other than the location of the springs and addition of the governor rod, and the fact that the governor rod extends beyond the strut 22.

In the prior art, the springs were on the forward end of the turbine 26 away from the strut 22. This arrangement located the center of gravity further from the mounting point of strut 22, and potentially diminished separation between an operating speed and a natural frequency. By placing the springs 38 on an opposed side of the strut 22 and the transmission interface between the bevel gears 32/34 relative to the turbine 24, the center of gravity is optimized and the natural frequency separation is increased. In addition, smaller bearings and an overall reduction in mass may be achieved. Further, the spring 38 mass is moved closer to the strut 22 as opposed to the prior art wherein the spring was further away. This reduces overhung mass and turbine imbalance issues that are associated with the spring changing position during governing.

Stated another way, governor rod 39 extends from the turbine 24 axially beyond the output shaft 36 and the strut 22 and to a plate 31. The spring 38 acts against the plate 31 and is also positioned about the transmission shaft 30.

The governor rod 39 extends along an axis which is generally co-axial to the propeller axis of rotation. The output shaft 36 extends along an axis which is non-perpendicular to the axis of rotation.

Figure 3:
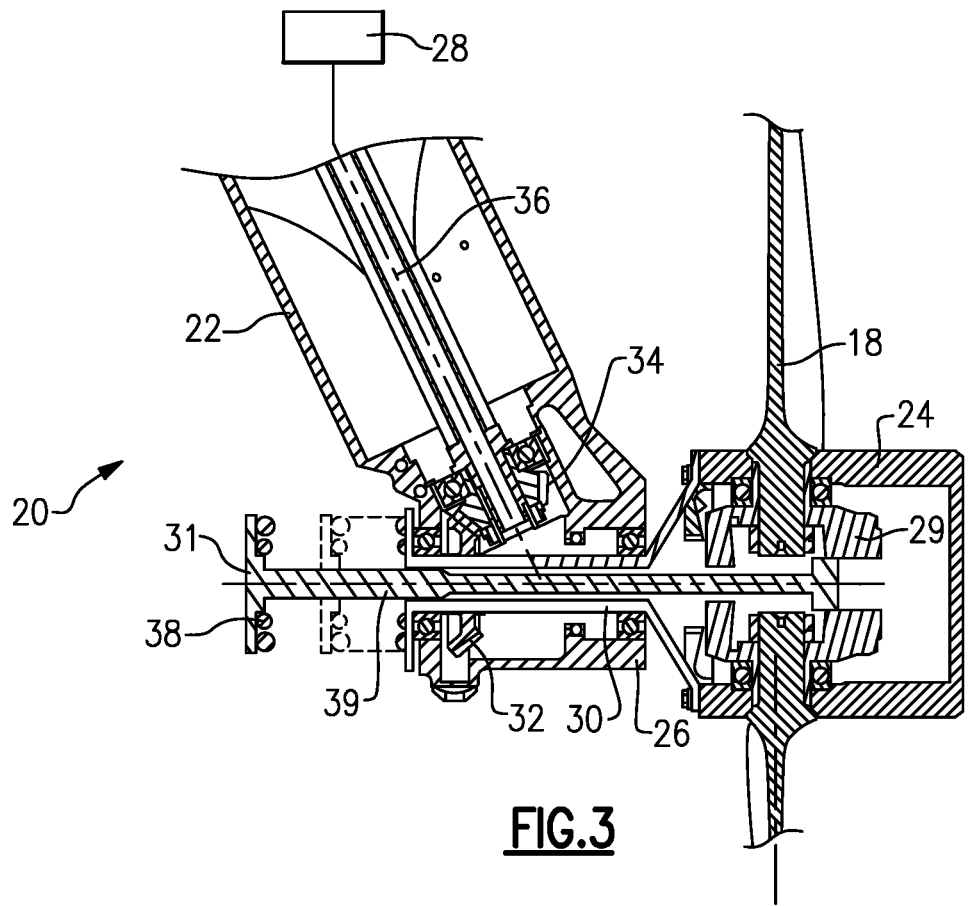
FIG. 3 shows a second embodiment.

FIG. 3 shows an embodiment where numerals common to FIG. 2A are used. In general, the embodiment 100 of FIG. 3 eliminates the outer housing 37 surrounding the spring 38. Endplate 31 is still used. The governor spring 38 acts against the plate 31, but is generally exposed radially outwardly of the transmission shaft. This has the potential benefits of making service and adjustment easier as well as reduced weight.

Figure 4:
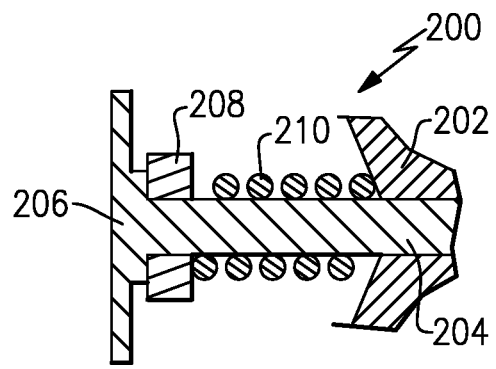
FIG. 4 shows yet another embodiment.

FIG. 4 shows yet another embodiment 200. In embodiment 200, the governor rod 204 extends through a fixed housing portion 202 and through the governor spring 210. An endplate 206 is still fixed to the rod 204. Bearing 208 supports the spring 210 on the plate 206 such that the spring 210 need not rotate. The other end of the spring is fixed to ground housing portion 202, which is a stationary portion. This may reduce issues with regard to the stability, frequency, and vibration of the ram air turbine.

Although an embodiment of this invention has been disclosed, a worker of ordinary skill in this art would recognize that certain modifications would come within the scope of this invention. For that reason, the following claims should be studied to determine the true scope and content of this invention.

The invention claimed is:

1. A ram air turbine comprising:
   turbine blades connected to rotate a transmission shaft about an axis of rotation, said transmission shaft connected for driving a first gear which is engaged to drive a second gear, said second gear connected to rotate an output shaft extending through a strut away from said transmission shaft;
   a governor arrangement to change a pitch angle of said turbine blades in response to speed, and including counterweights acting on a governor spring in said governor arrangement, said governor spring positioned on an opposed axial side of said strut taken along said axis, relative to said turbine blades; and
   wherein a governor rod is caused to move axially against the force of said governor spring when said counterweights move in a direction to close said pitch angle.

2. The ram air turbine as set forth in claim 1, wherein said governor spring rotating with said transmission shaft.

3. The ram air turbine as set forth in claim 2, wherein said governor spring reacting off a plate at an opposed end of said governor rod relative to said turbine blades.

4. The ram air turbine as set forth in claim 3, wherein a housing surrounds said governor spring and rotates with said transmission shaft and said governor spring.

5. The ram air turbine as set forth in claim 3, wherein said transmission shaft extends along an axis which is generally co-axial to a rotation axis of said turbine and said output shaft extends along an axis which is non-perpendicular to said axis of said rotation.

6. The ram air turbine as set forth in claim 3, wherein said first and second gears include a pair of bevel gears.

7. The ram air turbine as set forth in claim 3, wherein said governor rod extends axially beyond said strut within said governor spring and to said plate.

8. The ram air turbine as set forth in claim 3, wherein said governor spring acts against said plate, but said governor spring is generally exposed radially outwardly.

9. The ram air turbine as set forth in claim 3, wherein said governor rod rotates with said plate and said governor spring applying a force against said plate, and a bearing supporting said governor spring on said plate.

10. The ram air turbine as set forth in claim 1, wherein said governor spring reacting off a plate at an opposed end of said governor rod relative to said turbine blades.

11. The ram air turbine as set forth in claim 10, wherein said governor spring does not rotate with said transmission shaft.

12. The ram air turbine as set forth in claim 1, wherein a housing surrounds said governor spring and rotates with said transmission shaft and said governor spring.

13. The ram air turbine as set forth in claim 1, wherein said transmission shaft extends along an axis which is generally co-axial to an axis of rotation of said transmission shaft and said output shaft extends along an axis which is non-perpendicular to said axis of rotation.

14. The ram air turbine as set forth in claim 1, wherein said governor rod extends axially beyond said strut within said governor spring and to a plate.

15. A ram air turbine comprising:
    turbine blades connected to rotate a transmission shaft about an axis of rotation, said transmission shaft connected for driving a first gear which is engaged to drive a second gear, said second gear connected to rotate an output shaft extending through a strut away from said transmission shaft;
    a governor arrangement to change a pitch angle of said turbine blades in response to speed, and including counterweights acting on a governor spring in said governor arrangement, said governor spring positioned on an opposed axial side of said strut taken along said axis, relative to said turbine blades; and
    wherein said governor spring does not rotate with said transmission shaft.

16. The ram air turbine as set forth in claim 15, wherein a governor rod is caused to move axially against the force of said governor spring when said counterweights move in a direction to close said pitch angle.

17. The ram air turbine as set forth in claim 15, wherein said governor spring reacting off a plate at an opposed end of a governor rod relative to said turbine blades.

18. A ram air turbine comprising:
    turbine blades connected to rotate a transmission shaft, said transmission shaft connected for driving a first gear which is engaged to drive a second gear, said second gear connected to rotate an output shaft extending through a strut away from said transmission shaft;
    a governor arrangement to change a pitch angle of said turbine blades in response to speed, and including counterweights acting on a governor spring in said governor arrangement, said governor spring positioned on an opposed side of said strut relative to said turbine blades;
    wherein said governor spring reacting off a plate at an opposed end of a governor rod relative to said turbine blades;
    wherein said governor spring does not rotate with said transmission shaft; and
    wherein said governor rod rotates with said plate and said governor spring applying a force against said plate, and bearings supporting said governor spring on said plate.

* * * * *